July 12, 1927.

P. BASTIEN 1,635,571

BRAKE

Filed Oct. 4, 1923

Inventor
Paul Bastien
By B. M. Kent
Attorney

July 12, 1927. 1,635,571
P. BASTIEN
BRAKE
Filed Oct. 4, 1923  2 Sheets-Sheet 2
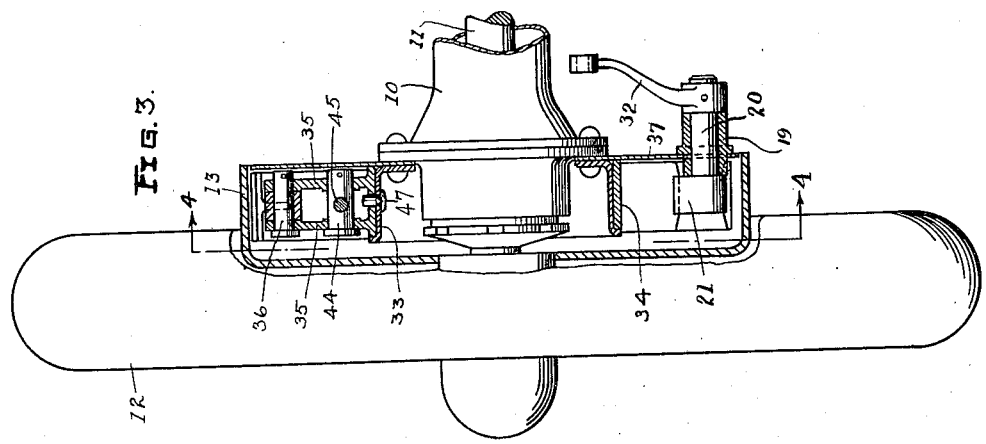
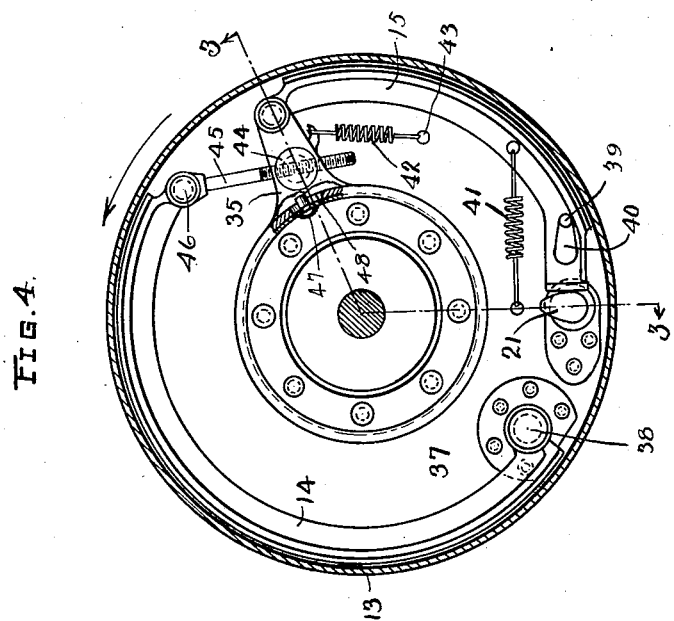
Inventor
Paul Bastien
By BMKent
Attorney Patented July 12, 1927.

1,635,571

UNITED STATES PATENT OFFICE.

PAUL BASTIEN, OF CLEVELAND, OHIO, ASSIGNOR TO BENDIX BRAKE COMPANY, OF CHICAGO, ILLINOIS, A CORPORATION OF ILLINOIS.

BRAKE.

Application filed October 4, 1923. Serial No. 666,514.

This invention relates to brake mechanism for motor vehicles and has for one of its objects the provision of a brake having the property of self-action, that is, the application of the brake to the drum with which it cooperates, tends to increase the pressure between the brake and the drum to increase the effectiveness of the brake.

Another object of the invention is to provide a brake of the self-acting type, as above described, in which the degree of application may be nicely controlled by the operator of the vehicle.

A further object of the invention is to provide a brake mechanism of the type referred to which will be especially adapted for modern methods of manufacturing on an economical basis.

A further object of the invention is to provide a brake of simple construction, the working parts of which may be readily replaced when worn.

Other objects of the invention and the features of novelty will be apparent from the following description, taken in connection with the accompanying drawings, of which:

Figure 1 indicates a side elevaton of a wheel having my invention applied thereto, certain parts being shown in section;

Fig. 3 is a view similar to Fig. 2 but showing another form of the invention, certain parts being shown in section on the line 3—3 of Fig. 4; and Fig. 4 is a section on the line 4—4 of Fig. 3.

Figure 1:
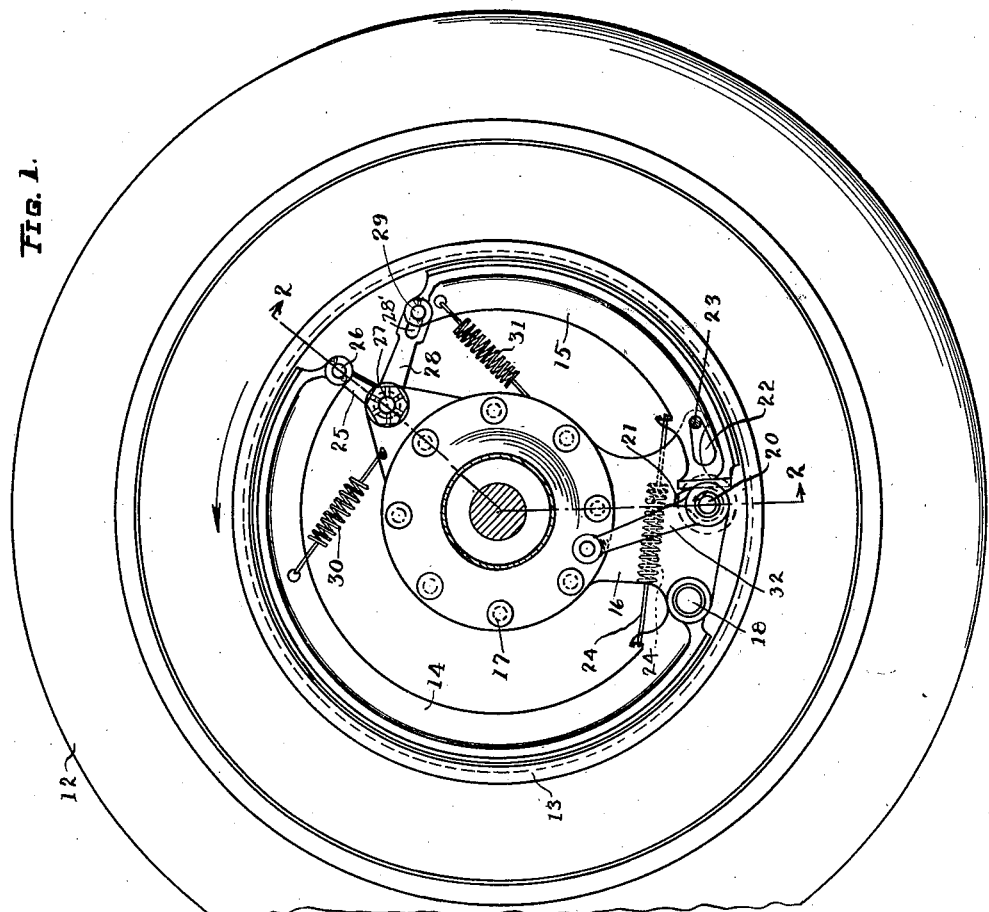
Figure 2:
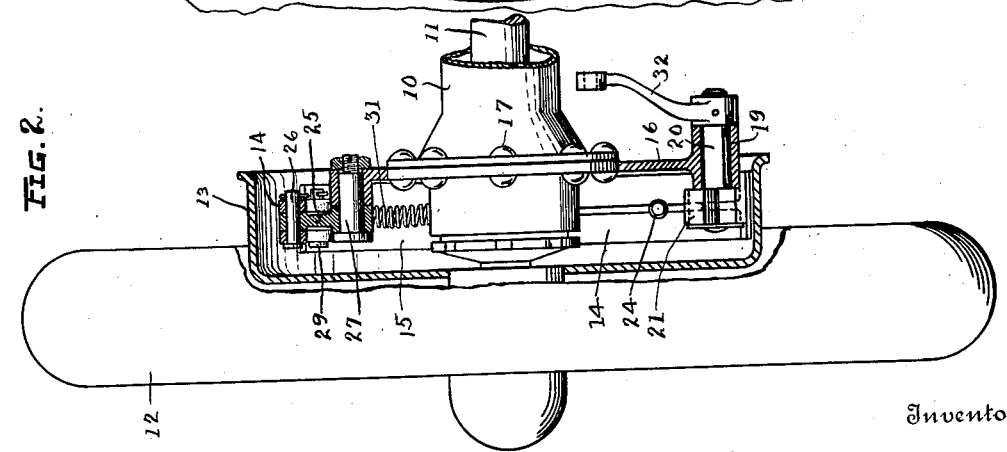
Fig. 2 is a composite view, a part of the figure being an elevation of the wheel shown in Fig. 1 and the remainder of the figure being a section on the line 2—2 of Fig. 1.

Referring to the form of the invention illustrated in Figs. 1 and 2, 10 indicates an axle housing, 11 the drive shaft therein, and 12 a wheel mounted at one end of the housing. A brake drum 13 is secured to the wheel 12, according to the usual custom, and has in cooperation therewith, the brake shoes 14 and 15. A brake spider 16, secured to the axle housing as by the rivets 17, has one end of the shoe 14 pivotally connected therewith, as indicated at 18. The spider 16 has a bearing 19 for the shaft 20 which carries a cam 21 for actuating the shoe 15. The shoe 15 has a slot 22 therein to receive the supporting pin 23 that is carried by the spider 16, the shape of the slot permitting the shoe 15 to be moved to the right, in Fig. 1, against the interior of the brake drum 13. A spring 24 connects the shoes 14 and 15 and holds one end of the latter shoe against the cam 21. The shoe 14 extends substantially one-half way around the interior of the brake drum 13 and is pivotally connected with the arm 25 of a bell crank lever, by the pin 26. This bell crank lever is pivotally mounted on the stud 27 which is carried by the spider 16 and has its other arm 28 connected with one end of the shoe 15 by a pivot pin 29 which engages with the slot 28' in the arm 28, thereby forming a sliding connection between the shoe 15 and the arm 28. Springs 30 and 31' having their outer ends respectively connected with the shoes 14 and 15 and their inner ends with the spider 16, serve to withdraw the shoes 14 and 15 from engagement with the brake drum.

An arm 32 on the shaft 20 is connected with a brake lever on the vehicle body (not shown) for the purpose of actuating the brake. When the lever 32 is actuated to rotate the cam 21 against the shoe 15, the latter is moved to the right, in Fig. 1, into engagement with the interior of the drum 13 and, as soon as engagement with the drum is effected, the shoe 15 tends to travel with the drum in the direction of the arrow in Fig. 1. This movement of the shoe 15 swings the aforesaid bell crank lever to the left because of the connection between the arm 28 and the shoe 15, and the shoe 14 is then swung to the left, by the arm 25, into engagement with the brake drum. In the operation above described the cam 21 will, of course, be rotated sufficiently to follow up the movement of the shoe 15 and force the latter against the brake drum. The tendency for the shoe 15 to rotate with the brake drum effects the application of the shoe 14 to the drum and the pressure with which the shoe 15 is forced against the drum will be determined by the drag which the drum exerts on the shoe 15 and this, in turn, is controlled by the pressure exerted on the shoe 15 by the cam 21. It will, therefore, be apparent that the brake is, to a large extent, self-acting in that the braking effect of the shoe 14 is governed by the circumferential drag on the shoe 15.

In the form of the invention illustrated in Figs. 3 and 4 there is secured to the housing 10 a bearing member 33 on which the hub 34 of the pair of arms 35 is rotatably mounted. The arms 35 are spaced apart and have their outer ends connected with the shoe 15 by the pivot pin 36. The brake spider 37 carries a stud 38 on which one end of the shoe 14 is pivotally mounted, as in the construction first described. The spider 37 also carries the bearing member 19 for the shaft 20 and the latter carries the cam 21 for actuating the shoe 15. The spider 37 also carries the pin 39 which projects through a slot 40 in the shoe 15 and supports the latter out of engagement with the drum 13. A spring 41 has one end connected with the spider 37, the other end with the brake shoe 15 and tends to hold the latter out of engagement with the brake drum. A spring 42, having one end connected with the spider 37, as indicated at 43, has its other end connected with one of the arms 35 and tends to rotate these arms downwardly, as they appear in Fig. 4.

A pin 44 is rotatably mounted in the arms 35 and has a threaded opening for one end of the link 45, the opposite end of this link being connected with the end of the shoe 14 by a pivot pin 46. The screw-threaded connection between the link 45 and the pin 44 permits an adjustment of the shoe 14 toward or away from the brake drum.

In the operation of the construction illustrated in Figs. 3 and 4, the rotation of the cam 21 forces the shoe 15 to the right, in Fig. 4, and the engagement of this shoe with the drum causes the shoe to move with the drum in the direction of the arrow in Fig. 4. This movement of the shoe 15 effects a slight rotation of the arms 35 and their hub 34, and the link 45 forces the shoe 14 against the brake drum. In this case, the pin 44, on account of its pivotal mounting in the arms 35, provides a kind of toggle action between the link 45 and the arms 35 which results in an increase of the pressure, with which the shoe 14 is applied to the drum, over the circumferential drag of the drum on the shoe 15. A stud pin 47, operating in a circumferential slot 48 in the hub 34, serves as a means of limiting the swinging movement of the arms 35.

From the foregoing it will be apparent that the shoes 14 and 15 may be readily removed and replaced in case of wear and that the parts generally are of simple construction and accessible for adjustment and inspection.

Having thus described my invention, what I claim is:

1. In brake mechanism, the combination of a brake drum, a plurality of brake shoes cooperating with the interior thereof, a relatively fixed anchorage for one of said shoes, a movable arm arranged to swing about a relatively fixed fulcrum and to which the other of said shoes is connected, means for actuating the last-mentioned shoe to engage it with said drum, and means operatively and positively connecting the first-mentioned shoe and said arm whereby the shoe is caused to engage said drum by the movement of the arm.

2. In brake mechanism, the combination of a brake drum, a plurality of brake shoes cooperating with the interior thereof, a relatively fixed anchorage for one of said shoes, a movable arm arranged to swing about a relatively fixed fulcrum and to which the other of said shoes is connected, means for actuating the last-mentioned shoe to engage it with said drum, a pivot on said arm, and a link connecting said pivot and the first-mentioned shoe and whereby the shoe is caused to engage said drum by the movement of the arm.

3. In brake mechanism, the combination of a brake drum, a plurality of brake shoes arranged end to end and engageable with the drum, torque-taking means anchoring one of the shoes, a brake-applying device acting on the other shoe, and power-multiplying means separate from the brake-applying device and positively connecting the shoes and through which said other shoe acts to apply the anchored shoe.

4. In brake mechanism, the combination of a brake drum, a pair of brake shoes cooperating with the interior thereof, a relatively fixed anchorage for one of said shoes, an arm arranged to swing about the axis of said drum and pivotally connected with the other of said shoes, means for actuating the last-mentioned shoe to engage it with said drum, a member pivotally mounted on said arm, and a link pivotally connected with the first-mentioned shoe and adjustably connected with said member and whereby said shoe is moved into and out of engagement with said drum by moving said arm.

5. In a braking apparatus, the combination of a rotary drum, a floating shoe for engagement therewith, a non-rotary mounting support, means for mounting said shoe to partake of limited movement with the drum comprising a link pivotally connected at one end to one end of the shoe and at the other end to the support substantially on a radial line from the axis of the drum passing through said connection with the shoe, means for forcing the shoe into engagement with the drum, a second shoe adapted to engage the drum, and a thrust member connecting an intermediate part of the link to the second shoe.

6. A wheel brake comprising a rotary drum, a stationary support, a lever pivoted on the support, a brake shoe for engaging the drum pivotally mounted on the free end of the lever, actuating means for swinging the free end of the shoe into engagement with the drum, the lever permitting the shoe to partake of the movement of the drum, a second shoe for engaging the drum pivotally mounted on one end of the support, and a member connecting the free end of the second shoe with the lever intermediate its ends for multiplying the tractive force applied to the first shoe and applying it to the second shoe.

7. A wheel brake comprising a rotary drum, a stationary support, a lever pivoted on the support, a brake shoe for engaging the drum pivotally mounted on the free end of the lever, actuating means for swinging the free end of the shoe into engagement with the drum, the lever permitting the shoe to partake of the movement of the drum, a second shoe for engaging the drum pivotally mounted at one end on the support, and a member connecting the free end of the second shoe with the lever for applying the rotary tractive force imparted to the first shoe as a brake-applying thrust on the second shoe.

8. A brake comprising, in combination, a drum, a shoe anchored at one end, an unanchored shoe arranged end to end with respect to the anchored shoe, a connection between the adjacent ends of the shoes, means for forcing the unanchored shoe against the drum, and a spring acting through the connection on the anchored shoe and holding the anchored shoe away from the drum until the spring is overcome by movement of the unanchored shoe.

9. A brake comprising, in combination, a drum, a shoe anchored at one end, an unanchored shoe arranged end to end with respect to the anchored shoe, power-multiplying means connecting the adjacent ends of the shoes, means for forcing the unanchored shoe against the drum, and a spring acting through the power-multiplying means on the anchored shoe and holding the anchored shoe away from the drum until the spring is overcome by movement of the unanchored shoe.

10. A brake comprising, in combination, a drum, a shoe anchored at one end, an unanchored shoe arranged end to end with respect to the anchored shoe, a connection between the adjacent ends of the shoes, means for forcing the unanchored shoe against the drum, and a spring fixedly mounted at one end and secured to the connection at the other end and resisting brake-applying movement of the anchored shoe.

11. A brake comprising, in combination, a drum, an adjacent stationary support, shoes arranged end to end within the drum, a lever pivoted at its end to one of the shoes and positively connected to the adjacent shoe, and a spring connected at its ends to the support and to the lever and arranged to resist brake-applying movement of said adjacent shoe.

12. A brake comprising, in combination, a drum, a pair of connected shoes arranged within the drum and one of which is arranged to force the other against the drum, a cam acting on the unconnected end of said one shoe to apply the brake, and a guide pin passing through a slot in said one shoe immediately adjacent the cam.

13. A brake comprising, in combination, a drum, a pair of shoes arranged end to end and engageable with the drum, a pivotally mounted member pivotally connected to one end of one shoe, and a link pivoted at one end to the pivotally-mounted member and pivoted at its other end to the adjacent end of the other shoe.

14. A brake comprising, in combination, a drum, a pair of shoes arranged end to end and engageable with the drum, a lever arranged generally radially of the drum and fulcrumed at its inner end and pivoted at its outer end to the end of one of the shoes, and a thrust member pivoted at one end to the end of the other shoe and at its other end to an intermediate part of the lever.

15. A brake comprising, in combination, a drum, a pair of shoes arranged end to end engageable with the drum, a lever arranged generally radially of the drum and fulcrumed at its inner end and pivoted at its outer end to the end of one of the shoes, and a thrust member pivoted at one end to the end of the other shoe and at its other end to an intermediate part of the lever, said thrust member being adjustable for length.

16. A brake comprising, in combination, a pair of shoes arranged end to end, one of the shoes being anchored at one end and the other being unanchored, and a movable connection between the adjacent ends of said shoes which is adjustable to separate the shoes more or less to compensate for wear.

17. A brake comprising, in combination, a pair of shoes arranged end to end, a movable connection between the adjacent ends of said shoes which is adjustable to separate the shoes more or less to compensate for wear, a fixed pivot forming an anchor for the unconnected end of one of the shoes and a brake-applying device acting on the unconnected end of the other shoe.

In testimony whereof I affix my signature.

PAUL BASTIEN.